United States Patent [19]

Albach et al.

[11] Patent Number: 5,673,185
[45] Date of Patent: Sep. 30, 1997

[54] CIRCUIT ARRANGEMENT FOR GENERATING A DC-SEPARATED OUTPUT VOLTAGE

[75] Inventors: Manfred Albach; Thomas Dürbaum, both of Aachen, Germany

[73] Assignee: U.S. Philips Corporation, New York, N.Y.

[21] Appl. No.: 626,529

[22] Filed: Apr. 2, 1996

[30] Foreign Application Priority Data

Apr. 7, 1995 [DE] Germany .......................... 195 13 065.0

[51] Int. Cl.$^6$ ................................................. H02M 3/335
[52] U.S. Cl. ................................................. 363/45; 363/21
[58] Field of Search ................................. 363/20, 21, 44, 363/45

[56] References Cited

U.S. PATENT DOCUMENTS

| | | | |
|---|---|---|---|
| 4,641,229 | 2/1987 | Easter | 363/21 |
| 4,712,169 | 12/1987 | Albach | 363/89 |
| 5,115,185 | 5/1992 | Fraidlin et al. | 363/45 X |

FOREIGN PATENT DOCUMENTS

| | | |
|---|---|---|
| 0474312A1 | 9/1991 | European Pat. Off. . |
| 3537536A1 | 4/1987 | Germany . |
| 0223315B1 | 2/1990 | Germany . |
| 43394515 | 4/1995 | Germany . |
| 2261331 | 10/1992 | United Kingdom . |

*Primary Examiner*—Peter S. Wong
*Assistant Examiner*—Y. J. Han
*Attorney, Agent, or Firm*—Edward W. Goodman

[57] ABSTRACT

A circuit arrangement for generating at least a DC output voltage (at 18, 19) from an at least substantially sine-shaped AC input voltage (at 2, 3) of a first frequency by a first rectifier arrangement (1) to which the AC input voltage can be applied (at 2, 3) and which has a DC output (4, 5) from which a rectified voltage is obtainable, a first inductance (6), a second rectifier arrangement (7) and a first filter capacitance (8) which, in this order, constitute a series arrangement connected parallel to the DC output (4, 5), a switched-mode power supply (9) having two input terminals (10, 11) with which it is arranged parallel to the first filter capacitance (8) and between which it includes a series arrangement of a second inductance (12) and a switching device (13) which is alternately switchable in the conducting state and in the blocked state at a second frequency and from which the DC output voltage(s) is (are) obtainable (at 18, 19), as well as a first control capacitance (23) by which the junction point (22) between the first inductance (6) and the second rectifier arrangement (7) is combined with the junction point (24) between the second inductance (12) and the switching device (13), as well as the series arrangement of a second control capacitance (28) and a second switching device (29) which is arranged parallel to the first control capacitance (23) between the junction points (22) and (24), the first inductance (6) and the first control capacitance (23) being dimensioned in such a way that a resonance frequency determined thereby is larger than the second frequency and the last-mentioned frequency is chosen to be large with respect to the first frequency, while the second control capacitance (28) is chosen to be large with respect to the first control capacitance (23). While using a small number of components, both the voltage rise at the switching device and thus the high-frequency interference originating therefrom can be reduced under all occurring circumstances, and the harmonics of the line current can also be reduced. Moreover, the maximum voltage occurring at the switching elements may be limited to a predetermined value without any additional losses.

1 Claim, 3 Drawing Sheets

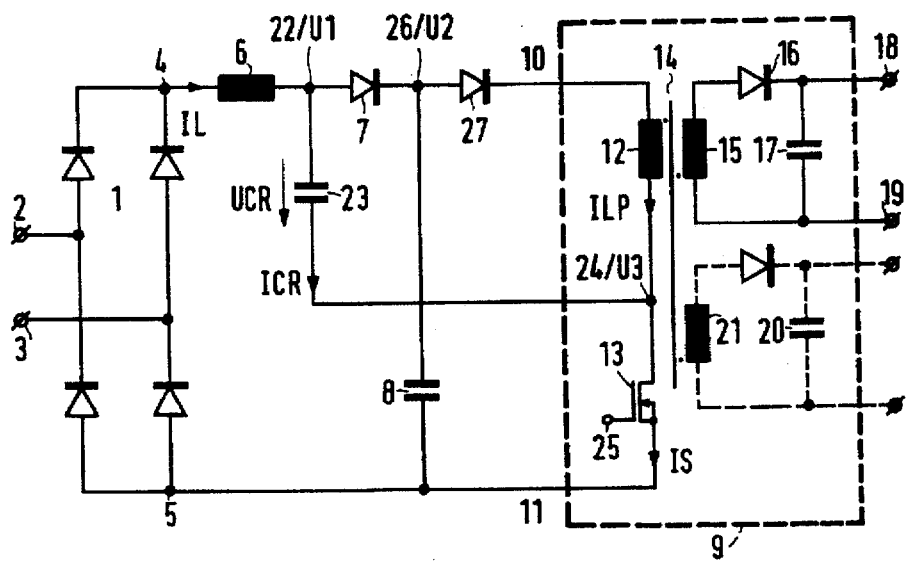
FIG. 1 PRIOR ART
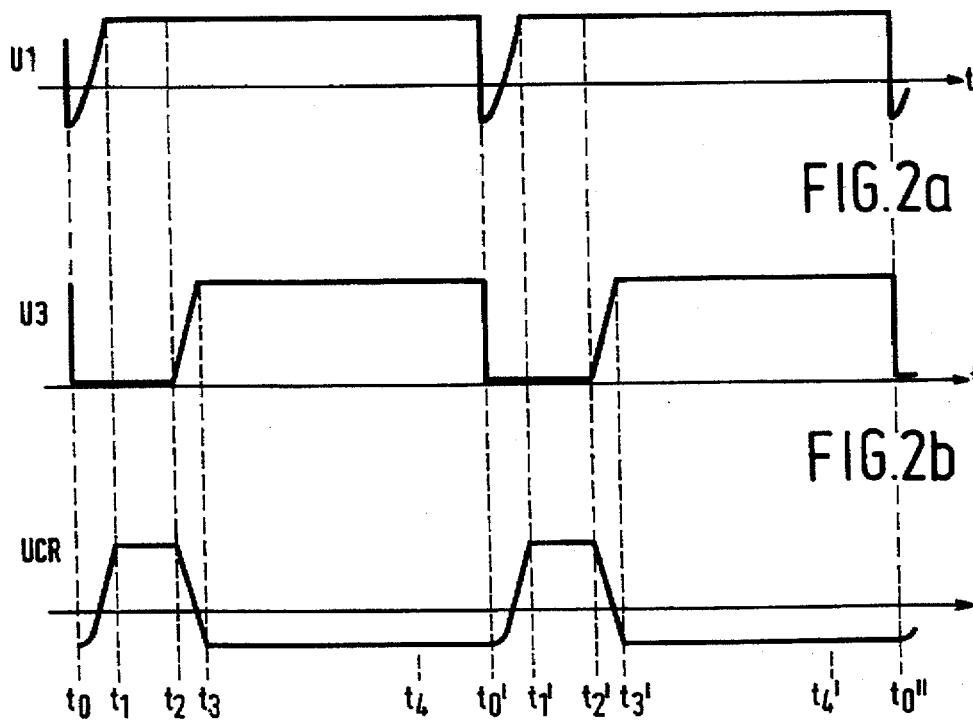
FIG. 2a PRIOR ART
FIG. 2b PRIOR ART
FIG. 2c PRIOR ART

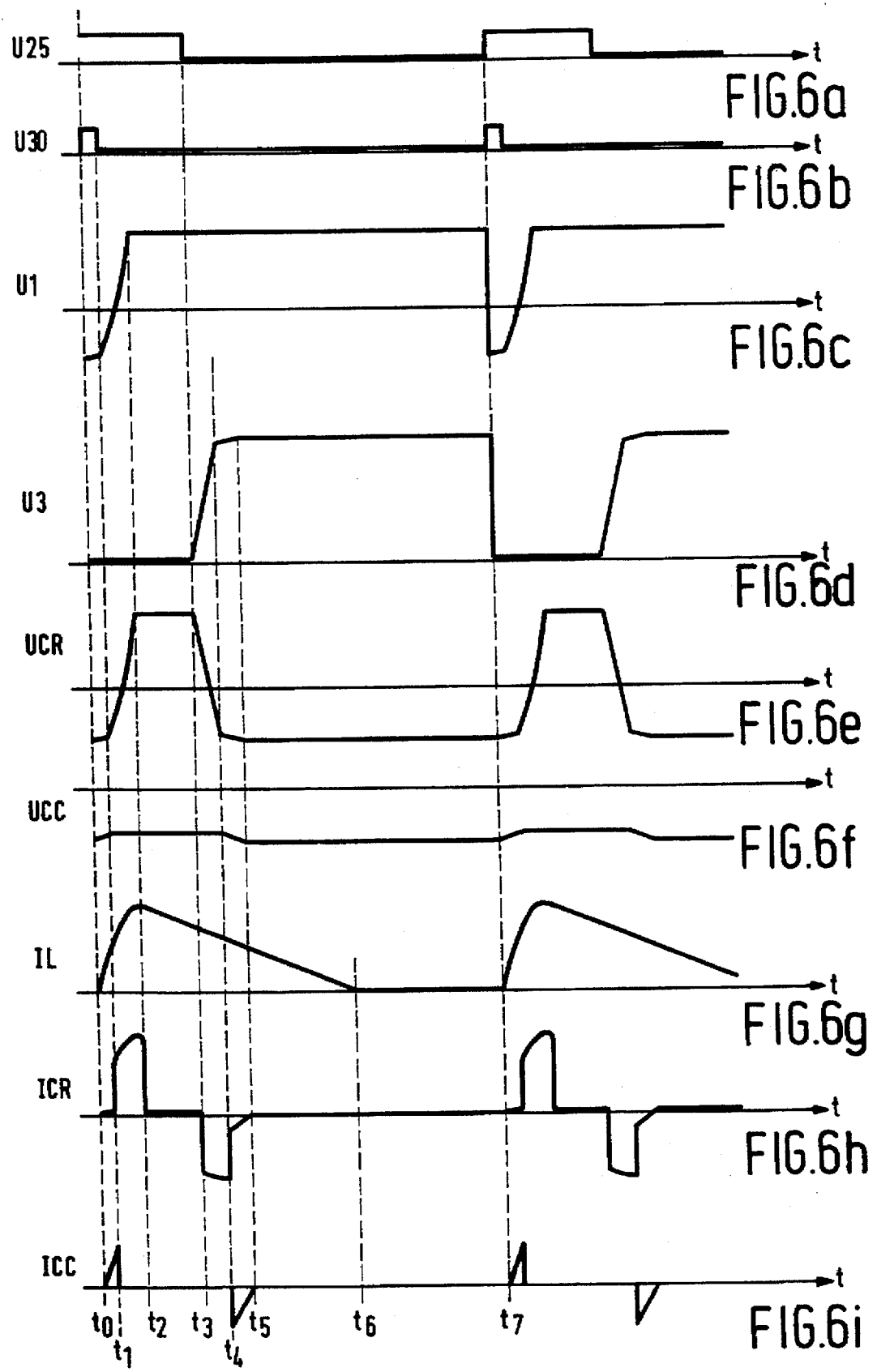

CIRCUIT ARRANGEMENT FOR GENERATING A DC-SEPARATED OUTPUT VOLTAGE

BACKGROUND OF THE INVENTION

1. Field of the Invention

The invention relates to a circuit arrangement for generating at least a DC output voltage from an at least substantially sine-shaped AC input voltage.

2. Description of the Related Art

In principle, circuit arrangements of this type are known from the monography "Schaltnetzteile in der Praxis" by Otmar Kilgenstein. In these arrangements, a sine-shaped lines AC voltage is converted, by means of a bridge rectifier and a storage capacitor, into a DC voltage which then serves as an input voltage for a switched-mode power supply which generates one or more DC output voltages. These output voltages may be DC-separated or DC-coupled to the lines AC voltage. An essential drawback of this known circuit arrangement is the generation of electromagnetic interference in the range of the switching frequencies and their harmonics, i.e., at relatively high frequencies, as well as in the range of the line voltage frequency, i.e., in the low-frequency range. In the latter case, particularly, a strong distortion of the currents derived from the line voltage manifests itself in a very detrimental way.

A further problem to be observed in switched-mode power supplies of the type described herein before is the occurrence of switching losses at the high-frequency switch of the switched-mode power supply. These switching losses, which increase with an increase of the switching frequency, lead to an inadmissible thermal load, particularly of the high-frequency switch, and obstruct an increase of the switching frequency beyond a limit given by this thermal load. However, on the other hand, an increase of the switching frequency for, for example, a reduction in size of the magnetic components of the switched-mode power supply is very desirable.

A circuit arrangement for generating a DC voltage from a sine-shaped input voltage is known from EP-B1-0 223 315, corresponding to U.S. Pat. No. 4,712,169, by which the line voltage frequency harmonics are reduced. To this end, the know circuit arrangement comprises a switched-mode power supply consisting of a diode, a coil, a capacitor and a transistor, to which the essentially sine-shaped input voltage is applied via a rectifier and whose elements are arranged in such a way that the diode is blocked and the coil current flows at least through the transistor, when the transistor is turned on, and through the diode and a parallel circuit of a load and the capacitor, when the transistor is turned off. The load may comprise a (further) switched-mode power supply via which the ultimate user is fed. In this circuit arrangement, a switched-mode power supply which does not employ DC separation is arranged between the rectifier and the capacitor. This (further) switched mode power supply is preferably constituted as an up-converter with which a sine-shaped current can be derived from the line voltage and which simultaneously generates a voltage at the capacitor which is higher than the peak of the line AC voltage. Consequently, the subsequent switched-mode power supply within the load, which may comprise a transformer, may be dimensioned for the mean output power. Since this (further) switched-mode power supply is fed with a high input voltage, the currents occurring therein and thus also the attendant ohmic losses are relatively small. However, the reduced number of circuit components for the (further) switched-mode power supply is offset by the additional number of components for the up-converter which, as described, essentially comprises a coil, a freewheel diode and a high frequency-operated switch with its corresponding control circuit.

Attenuation members (referred to as snubber or voltage clamps), with which a loss-beset attenuation of flyback pulses at high-frequency switches can be carried out, are known from DE-OS 35 37 536, or from the article "Snubber Circuits: Theory, Design and Application" by Philip C. Todd, published in "Unitrode Switching Regulated Power Supply Design Seminar Manual" of May, 1993. Such circuits may particularly be used for reducing high-frequency interference, because they limit the rise time of the cut-off voltage at the high-frequency switch. In fact, the more rapidly the voltage at the high-frequency switch can rise upon switching to the blocked state, the larger the capacitive interference currents will be, which currents flow in the omnipresent parasitic capacitances in the surroundings of the high-frequency switch, for example, in a high-frequency switch terminal connected to a dissipator and ground. If such interferences are not attenuated in advance, elaborate line voltage filters may be required for their suppression. Particularly, such interferences may have their effect in switched-mode power supplies in monitors or television sets but also in other comparable sensitive apparatuses, because they may become visible, for example, as picture interference in these cases.

Also the attenuation members described represent an additional number of circuit components. The number of circuit components will particularly increase if the described, known measures for suppressing the low and high-frequency interferences should jointly be taken in a power supply circuit.

A circuit is known from P 43 39 451.5, corresponding to U.S. Pat. No. 5,612,856, in which, with a low number of circuit components, the voltage rise is reduced, i.e., the rise time of the voltage at the high-frequency switch of the switched-mode power supply, and hence, interference and switching losses are reduced at high frequencies, and, simultaneously, a possibly substantially sine-shaped current is derived from the mains, so that the harmonics of this mains current and hence the low-frequency interference are reduced by the circuit arrangement.

The circuit arrangement is shown again in FIGS. 2a–2c show characteristic voltage waveforms for two high-frequency switching periods. If the high-frequency switch 13 is switched off at the instant $t_2$, then the current ILP at the primary side of the transformer 12 remains constant due to the fact that it maintains the energy and then flows through the capacitor 23 and the diodes 7 and 27. Due to the practically constant current ILP, the charge of the capacitor 23 is reversed with a temporally linear voltage variation. If the capacitor voltage UCR, which is also simultaneously present at the primary side of the transformer, has a negative value whose amount is equal to the transformer output voltage transformed at the primary side, the output diode 16 will become conducting and the energy stored in the transformer can be supplied from the output capacitor 17. In a practical circuit, the transformer will, however, exhibit leakage inductances which ensure that the take-up of current at the primary side, as well as the increase of the current at the secondary side, cannot be realized in an arbitrarily short time, i.e., the current still flowing for a short period of time at the primary side will negatively charge the capacitor 23 to an even further extent. As a result, the cut-off voltage occurring at the high-frequency switching element 13 may become very high, thus necessitating the use of an expensive component at a corresponding cut-off voltage (for example, 800 V). For this reason, the protective circuit (voltage clamp) known from the literature referred to in the opening paragraphs, is used very frequently, which voltage clamp takes over the energy from the leakage inductance and converts it into heat.

On the one hand, this voltage clamp reduces the overall efficiency of the switched-mode power supply and, on the other hand, the combination with the circuit of FIG. 1 leads to a further unwanted problem which will now be described. The characteristic curves shown in FIGS. 2a–2c should be considered for this purpose. As already elucidated, the capacitor 23 is charged to a negative voltage after the high-frequency switch 13 is switched off. This voltage is maintained until the start of a new switching cycle. When the high-frequency switch 13 is switched on at the instant $t_0$, the coil 6 and the capacitor 23 will constitute a resonant circuit which is connected to the rectified line input voltage. This circuit section is shown once again separately in FIG. 3. With the initial conditions $IL(t_0)=0$ and $UCR(t_0)<0$, the voltage variation $UCR(t)$ can be defined by the following equation.

$$UCR(t)=[UCR(t_0)-\mu_i]^* \cos(\omega t)+\mu_i$$

As a maximum value of this voltage, the value $$UCR_{max}=2^*\mu_i-UCR(t_0)=2^*\mu_i|UCR(t_0)|$$

is obtained for $\cos(\omega t)=-1$. Upon a zero crossing of the line AC voltage, i.e., at $\mu_i=0$, the capacitor voltage can change over only from an initially negative value to a positive value of the same amplitude for reasons of resonance. With an increasing line voltage, the capacitor voltage may rise by the additional value of $2^*\mu_i$. The overall variation of this function is shown by means of the thin line for a complete line voltage half wave in FIG. 4. However, if this overall voltage exceeds the voltage U2 at the storage capacitor 8, the diode 7 will become conducting and the two capacitors 23 and 8 will be arranged in parallel. Due to the much larger capacitance of the capacitor 8, the voltage is therefore held at the constant value U2.

The problem referred to in the introduction now resides in the range of the line voltage zero crossings. Here, the voltage UCR reaches a value which remains below U2. When the high-frequency switch 13 is switched off at the instant $t_2$, the cut-off voltage U3 at the switch may be computed by means of a voltage cycle in the loop comprising the elements 13, 23, 7 and 8 as $$U3=U2-UCR,$$

i.e., the voltage at the switch will directly jump from zero to the difference value between the two values U2 and UCR. The rise time of the cut-off voltage at the switching element will be limited by C23 only above this value.

SUMMARY OF THE INVENTION

It is an object of the invention to modify the circuit arrangement shown in FIG. 1 in such a way that the maximum cut-off voltage occurring at the high-frequency switch can be limited by means of a voltage clamp, which is principally without losses, at a lower value, for example, 600 V, while simultaneously maintaining the limited rise time of the voltage at the switching element under all circumstances, i.e., also at a line input voltage of zero.

According to the invention, this object is solved by a circuit arrangement for generating at least a DC output voltage from an at least substantially sine-shaped AC input voltage of a first frequency by means of a first rectifier arrangement to which the AC input voltage can be applied and which has a DC output from which a rectified voltage is obtainable, a first inductance, a second rectifier arrangement and a first filter capacitance which, in this order, constitute a series arrangement connected parallel to the DC output, a switched-mode power supply having two input terminals with which it is arranged parallel to the first filter capacitance and between which it comprises a series arrangement of a second inductance and a switching device which is alternately switchable in the conducting state and in the blocked state at a second frequency and from which the DC output voltage(s) is (are) obtainable, as well as a first control capacitance by which the junction point between the first inductance and the second rectifier arrangement is combined with the junction point between the second inductance and the switching device, as well as the series arrangement of a second control capacitance and a second switching device which is arranged parallel to the first control capacitance between the junction points, the first inductance and the first control capacitance being dimensioned in such a way that a resonance frequency determined thereby is larger than the second frequency and the last-mentioned frequency is chosen to be large with respect to the first frequency, while the second control capacitance is chosen to be large with respect to the first control capacitance.

In the circuit arrangement according to the invention, the two control capacitances do not only take over the function of the up-converter for reducing the low-frequency distortions of the line current, but also the function of attenuating the high-frequency interferences originating from the switching devices, particularly, the reduction of the rise time of the voltage across the switching devices upon transition to the non-conducting state, and also the limitation of the maximum cut-off voltages occurring at the switching devices. As compared with the known, dissipative attenuation members, no ohmic losses occur in the circuit arrangement according to the invention, so that the circuit arrangement is heated to a reduced extent and its efficiency is enhanced.

BRIEF DESCRIPTION OF THE DRAWINGS

With the above and additional objects and advantages in mind as will hereinafter appear, the subject invention will be described with reference to the accompanying drawings, in which:

FIG. 1 shows a prior art circuit arrangement for reducing voltage rise time an a switched-mode power supply;

FIGS. 2a–2c show characteristic waveforms for the circuit arrangement of FIG. 1;

FIGS. 6a–6i show characteristic waveforms for the circuit arrangement of FIG. 5.

DESCRIPTION OF THE PREFERRED EMBODIMENT

Figure 5:
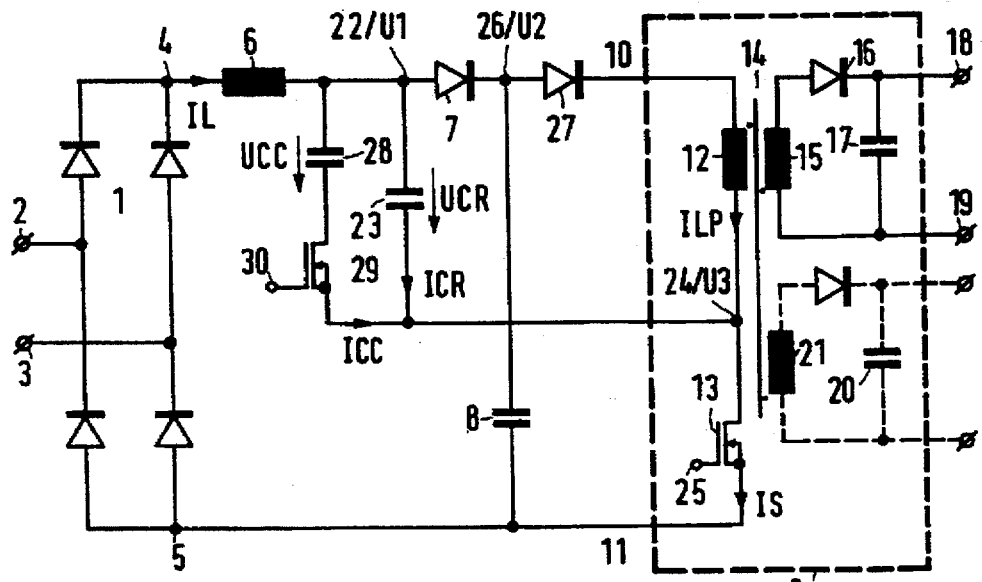
FIG. 5 shows and embodiment of a circuit arrangement according to the invention.

The general description of the operation of this circuit arrangement essentially corresponds to the description of the circuit arrangement described in Application PHD 93-175 (P 43 39 451.5), from which it may be copied. Consequently, only the differences as a result of the two components 28 and 29 in FIG. 5 will be elucidated. The associated current characteristics and voltage waveforms are shown in FIGS. 6a–6i.

The instant $t_0$, at which the main switch 13 is switched on, will be assumed to the starting point. The switch 29 is also switched on at the same instant. Since the voltages UCR and UCC have the same negative value, switch 29 is switched on at zero value and no equalizing currents flow between the two capacitors 23 and 28. These two components are parallel connected in the subsequent interval between $t_0$ and $t_1$. The resonant current IL flows through the parallel circuit 23 and 28 and the switch 13. The split-up of the overall current IL between the two capacitors is effected proportionally to the capacitance of the two components, i.e., the essentially larger part of the current flows through the capacitor 28. Due to the relatively large overall capacitance of the two components 23 and 28, the negative voltage UCR=UCC will initially decrease very slowly. The switch 29 is switched off at the instant $t_1$, i.e. the voltage UCC at 28 will remain constant during the subsequent time intervals. Up to the instant $t_4$ in FIG. 6, this circuit behaves analogously to the circuit in FIG. 1. The essential differences so far is that, due to the partial reversal of the charge of capacitor 28, an additional current is produced in the coil 6. It is thereby achieved that sufficient energy is present in the coil 6 for reversing the charge of the capacitor 23 to the voltage value U2 of the elco voltage, i.e., also at the zero crossing of the line voltage, the positive value of UCR will become equal to U2. The afore-described voltage jump at the switch 13 immediately after switch-off is certainly avoided.

After the switch 13 is switched off, the voltage U3 will rise in a time-limited manner in the interval between $t_3$ and $t_4$, dependent on the peak value of the current ILP and the value of the capacitor 23. At the instant $t_4$, the meanwhile negative voltage UCR reaches the value of the voltage UCC. Consequently, the inverse diode of the MOSFET switch 29 will become conducting at this moment and the two capacitors 23 and 28 are parallel again. The cut-off voltage is taken off at the switch 29 in the interval between $t_3$ and $t_4$ at the same rise time as the voltage rise of U3. In the interval between $t_4$ and $t_5$, the voltage UCR=UCC will increase only very slowly due to the essentially larger overall capacitance of the parallel-connected components 23 and 28 i.e., the energy stored in the leakage inductance only leads to a very limited rise of the overall voltage across the switch 13 and thus allows the use of a MOSFET switch having a reduced voltage stability.

Figure 3:
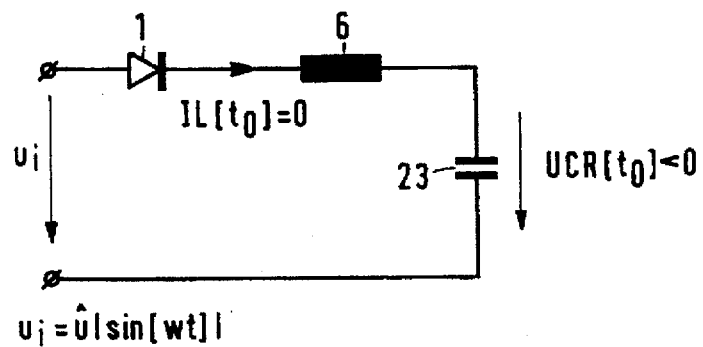
FIG. 3 shows a portion of the circuit arrangement of FIG. 1.
Figure 4:
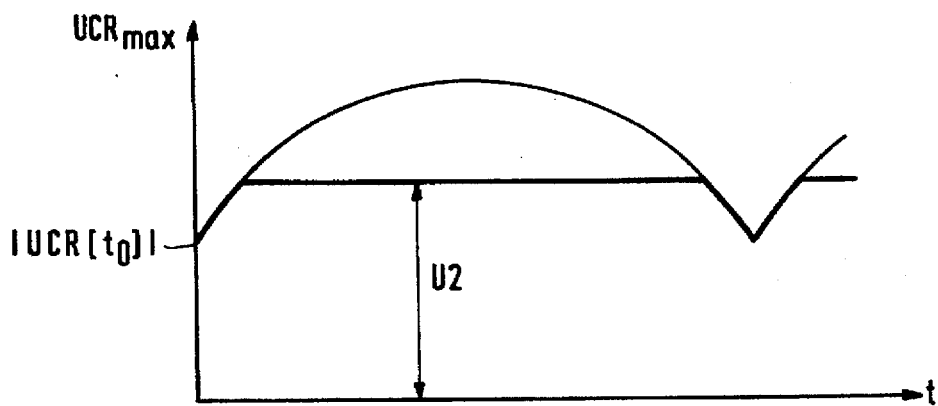
FIG. 4 shows a waveform of a voltage in the circuit arrangement of FIG. 1.

With the switch-on time $t_1-t_0$ of the switch 29, this circuit arrangement provides a further degree of freedom for optimization. The minimum switch-on time is given by storing sufficient energy in the coil 6 to reverse the charge of the capacitor 23 completely. This time may, however, be maximally increased up to the instant $t_3$, i.e., up to the switch-on time of the switch 13, but in border cases (synchronous switching of the two switches 13 and 29), the same problems as described with reference to FIG. 4 will occur again. Nevertheless, a control possibility is provided for fixing the instant $t_1$ within the interval between $t_0$ and $t_3$ so as to maintain, for example, the voltage at capacitor 8 constant with respect to fluctuations of the input voltage, or to further reduce the harmonics of the mains current.

After the current ILP has decayed, the circuit shown in FIG. 5 behaves analogously again to the circuit shown in FIG. 1 in the time interval $t>t_5$. As compared with the circuit arrangement hitherto used, the improvements within a high-frequency switching cycle are thus fully described.

Numerous alterations of the structure herein disclosed with present themselves to those skilled in the art. However, it is to be understood that the present embodiment is for purposes of illustration only and not as a limitation of the invention. All such modifications which do not depart from the spirit of the invention are intended to be included within the scope of the appended claims.

We claim:

1. A circuit arrangement for generating at least one DC output voltage from an at least substantially sine-shaped AC input voltage of a first frequency by means of a first rectifier arrangement to which the AC input voltage is applied and which has a DC output from which a rectified voltage is obtainable, a first inductance, a second rectifier arrangement and a first filter capacitance which, in this order, constitute a series arrangement connected in parallel to the DC output, a switched-mode power supply having two input terminals with which said switched-mode power supply is arranged in parallel to the first filter capacitance, said switched-mode power supply comprising, between said input terminals, a series arrangement of a second inductance and a switching device which is alternately switchable in a conducting state and in a blocked state at a second frequency and from which the at least one DC output voltage is obtainable, as well as a first control capacitance by which a junction point between the first inductance and the second rectifier arrangement is combined with a junction point between the second inductance and the switching device, as well as a series arrangement of a second control capacitance and a second switching device which is arranged in parallel to the first control capacitance between the junction points, the first inductance and the first control capacitance being dimensioned in such a way that a resonance frequency determined thereby is larger than the second frequency and the second frequency is chosen to be large with respect to the first frequency, while the second control capacitance is chosen to be large with respect to the first control capacitance.

\* \* \* \* \*